July 28, 1959 H. WALDMAN 2,896,945

TAPE RECORDING AND REPRODUCING APPARATUS

Filed May 8, 1957 3 Sheets-Sheet 1

*INVENTOR.*
HERBERT WALDMAN

BY Hane and Nydick

ATTORNEYS

July 28, 1959 H. WALDMAN 2,896,945

TAPE RECORDING AND REPRODUCING APPARATUS

Filed May 8, 1957 3 Sheets-Sheet 2

*INVENTOR.*
HERBERT WALDMAN

*BY* Hane and Nydick

ATTORNEYS

TAPE RECORDING AND REPRODUCING APPARATUS

Filed May 8, 1957 3 Sheets-Sheet 3

INVENTOR.
HERBERT WALDMAN
BY
Hane and Nydick
ATTORNEYS

United States Patent Office 2,896,945
Patented July 28, 1959

2,896,945

TAPE RECORDING AND REPRODUCING APPARATUS

Herbert Waldman, Brooklyn, N.Y., assignor, by mesne assignments, to Robosonic National Industries Corp., New York, N.Y., a corporation of Delaware Application May 8, 1957, Serial No. 657,931

11 Claims. (Cl. 271—2.3)

The present invention relates to tape recorders for recording intelligence and reproducing recorded intelligence, the term "tape" as used herein being intended to include a message carrier such as magnetizable wire.

Tape recorders of the general kind above referred to as heretofore known, comprise basically a mechanical mechanism for moving and guiding the tape past magnetic or sound heads for recording, reproducing, or erasing intelligence and electronic equipment for energizing said heads and picking up or reproducing intelligence.

One of the objects of the present invention is to provide a novel and improved recording and reproducing apparatus which permits recording upon or reproduction from a second tape. Either one of the two tapes and the associated assemblies may be activated, or both simultaneously. This affords the advantage that intelligence recorded on the second tape and reproduced by the apparatus may be recorded on the first tape and vice-versa by operating both tapes concurrently. Such an arrangement may be used to produce from a master tape any desired number of tapes recording the intelligence on the master tape. The second tape may also be utilized to extend the available recording or reproducing time of the apparatus by operating the two tapes consecutively.

Another object of the invention is to provide a novel and improved recording and reproducing apparatus in which the drive for the second tape is derived from the same drive means as the drive for the first tape. This affords the advantage that two tapes can be operated by means of a common capstan and a single motor.

Still another object of the invention is to provide a novel and improved recording and reproducing apparatus including equipment for operating selectively the standard tape of the apparatus transported from the supply reel to the take-up reel for recording or reproducing in the conventional manner, or a second tape in the form of an endless loop.

The latter tape may be used to reproduce a repeat message; for instance, of an informatory nature.

A further object of the invention is to provide a novel and improved recording and reproducing apparatus for selectively operating the first tape transported from the supply reel to the take-up reel of the apparatus or a second tape in the form of an endless loop and which apparatus permits utilization of the driving mechanism for the endless tape to rewind the first tape upon its supply reel. As such rewind is effected at the rate of speed of the endless tape during recording thereupon or reproduction therefrom, it is rather slow. This affords the advantage that the rewinding of the first tape may be carried out while the second tape is being recorded upon or reproduced without demanding the constant attention on the part of the operator that is required by the normal high speed rewind mechanism for the first tape and without the appreciable noise caused by the standard fast rewind.

A still further object of the invention is to provide a novel and improved adjustable mounting of the magnetic head and the attendant components for the second tape.

Other and further objects, features and advantages of the invention will be pointed out hereinafter and set forth in the appended claims forming part of the application.

In the accompanying drawing, a preferred embodiment of the invention is shown by way of illustration and not by way of limitation. In the drawing.

Figures 9, 9A:
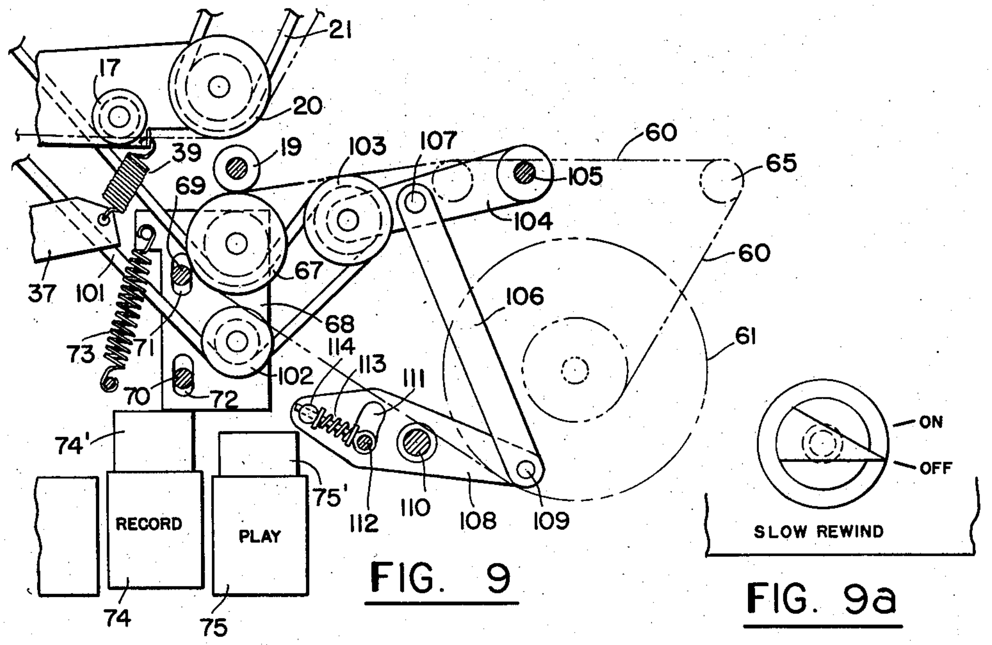
Fig. 9 is a fragmentary detail view of the mechanism for operating the slow rewind of the standard tape in its rest or non-active position.

Fig. *9a* is a detail view of the control member for controlling the slow rewind mechanism, the control member being shown in the position corresponding to Fig. 9.

Figure 10:
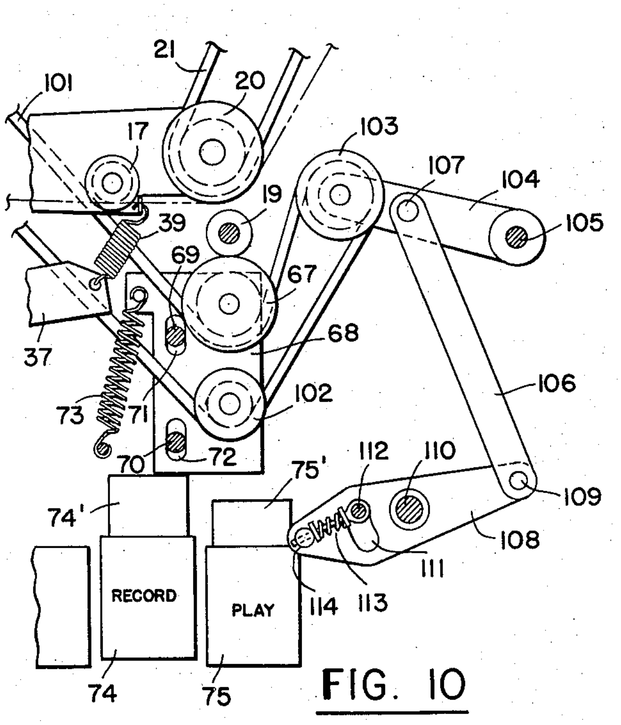

Fig. 10 is a fragmentary view similar to Fig. 9, showing the mechanism operated for slow rewind, and Fig. *10a* is a view similar to Fig. *9a*, but showing the control member in the position corresponding to Fig. 10.

Before referring to the figures in detail, it should be pointed out that the recording and reproducing apparatus according to the invention comprises all the equipment, both mechanical and electronic, that is customary in apparatus of this kind and that such equipment is of conventional design. Accordingly, only those standard components that are essential for the understanding of the invention are shown and described.

Figures 1, 2, 3, 4, 5, 6:
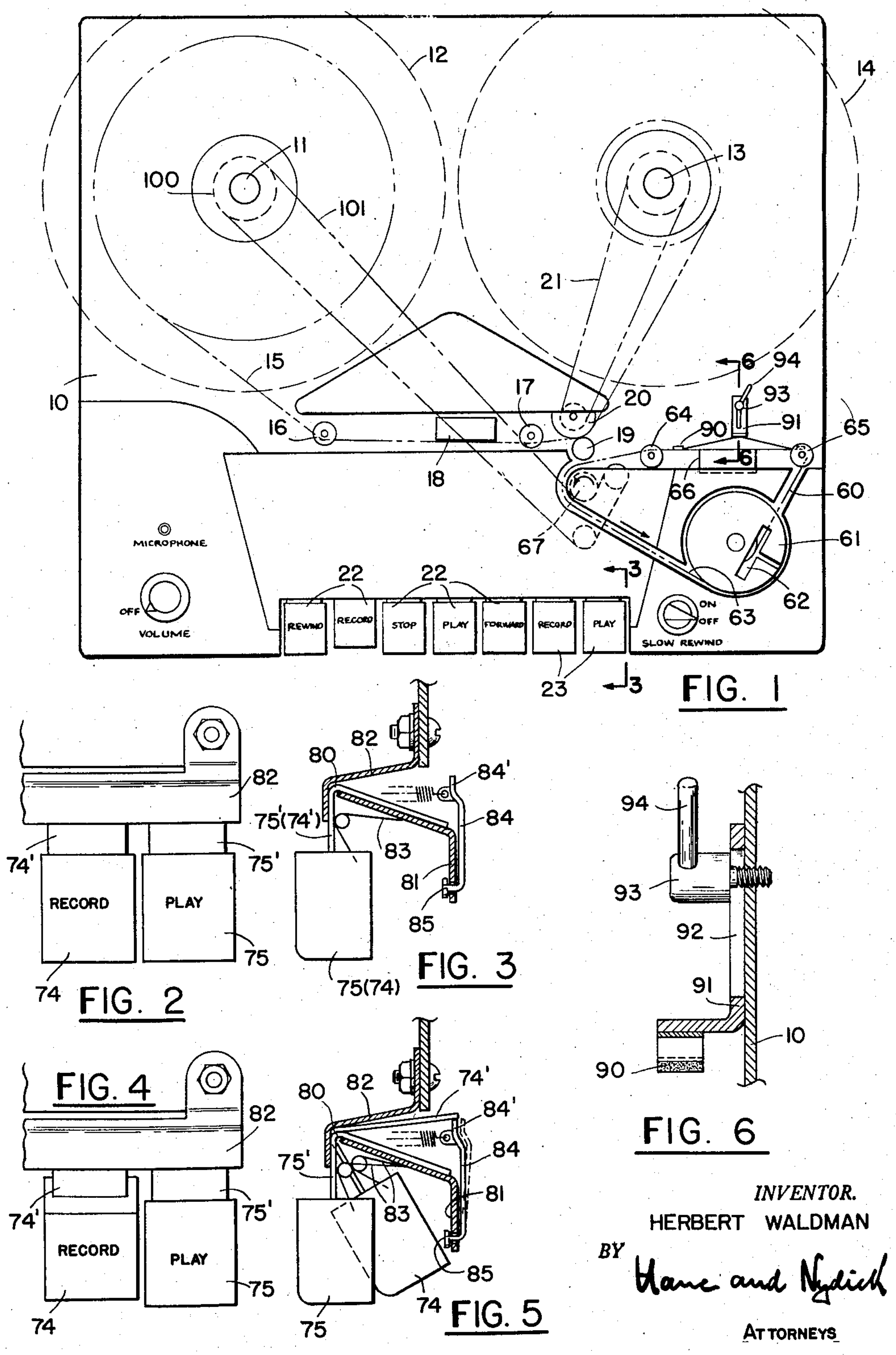
Fig. 1 is a plan view of an apparatus according to the invention, the shield concealing part of the mechanism being removed.
Fig. 2 is a fragmentary plan view of the operating knobs of the arrangement according to the invention showing the two knobs in the rest position.
Fig. 3 is a sectional view of Fig. 2 taken on line 3—3 of Fig. 1.
Fig. 4 is a fragmentary plan view similar to Fig. 2, but showing the knob marked "Record" in operating position.
Fig. 5 is a sectional view similar to Fig. 3, but showing the "Record" knob in operating position.
Fig. 6 is a sectional view taken on line 6—6 of Fig.1 on an enlarged scale.

Referring first to Fig. 1 in detail, this figure shows the chassis plate 10 of the apparatus through which extends the drive shaft 11 for the supply reel 12 and the drive shaft 13 for the take-up reel 14. The tape 15 is guided by idlers 16 and 17 past a magnetic head 18 and between a capstan 19 and a friction roller 20. The capstan is driven from the motor of the apparatus (not shown). Friction roller 20 is mounted movable relative to the capstan. It may be moved into or out of frictional engagement with the peripheral surface of the capstan for a purpose and in a manner which will be more fully explained hereinafter. The drive for the shaft 13 of the take-up reel is derived from the friction roller with which it is coupled by any suitable means shown as an elastic spring belt 21. As is apparent, the tension of this belt will be stressed or relaxed by a displacement of the friction roller toward and away from, respectively, the capstan.

There are further shown in Fig. 1, five operational knobs 22, customarily provided in apparatus of the kind herein referred to. The knobs are identified by appropriate legends. The circuit controls initiated by operation of any one of the knobs should be visualized as being conventional and do not constitute part of the present invention. There is further shown, the microphone jack and the control knob for switching off the apparatus and the volume control. All components hereinbefore described are conventional.

Figures 7, 8:
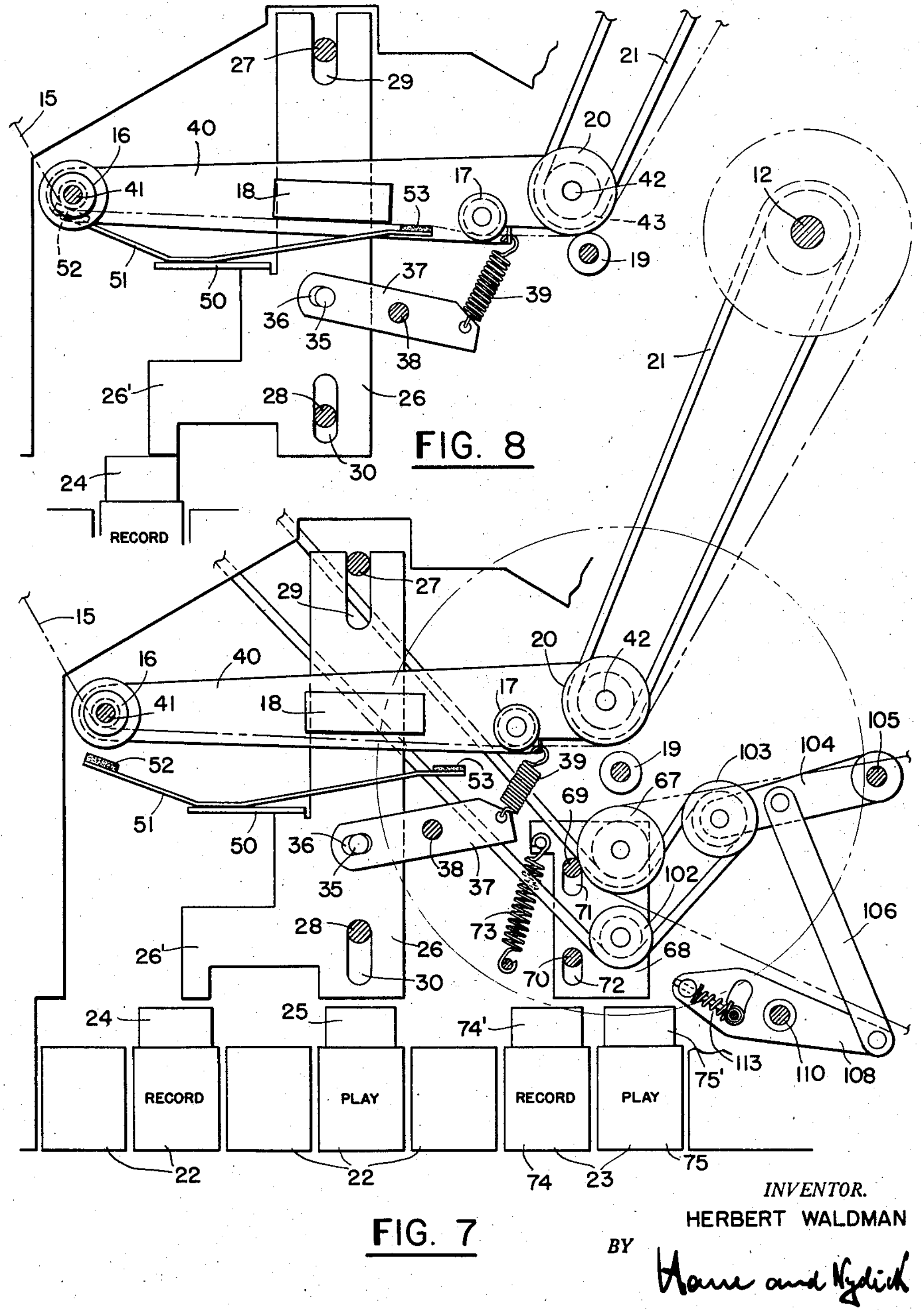
Fig. 7 is a fragmentary plan view of the mechanical mechanism for operating the standard or first tape of the apparatus and also showing part of the mechanical mechanism for operating the slow rewind of the standard tape through the driving mechanism for the second tape.
Fig. 8 is a fragmentary plan view showing part of the components of Fig. 7 in a different operational position.

Turning now to Figs. 2 through 10*a* in conjunction with Fig. 1, Figs. 7 and 8 show the effect of operating any one of the knobs of the group 22 upon the position of friction roller 20 relative to capstan 19 and upon other components of the apparatus instrumental in the operation of tape 15 which is sometimes herein referred to as "standard tape." More specifically, it is assumed that it is now intended to operate the knob marked Record. Each of the five knobs of group 22 may be depressed from the position shown in Fig. 7 into the position shown in Figs. 1 and 8 for the knob Record. The depressed knob is retained in its depressed position by retaining means of the kind shown in Figs. 2 through 5 for a second group of knobs 23 and more fully explained hereinafter. Each depressed knob is released by depressing any other knob and returns into its rest position by spring action. Of the five knobs of group 22, the knobs marked "Record" and "Play" have an extension 24 and 25, respectively, which in the depressed position of one of these two knobs, coacts with a plate 26 or a lateral extension 26' thereof. Plate 26 is axially slideable on the chassis plate 10, or more specifically in a recessed portion thereof and is guided by means of pins 27 and 28 extending from the chassis plate and engaging longitudinal slots 29 and 30, respectively, in plate 26. A spring (not shown) biases plate 26 into the position of Fig. 7.

Plate 26 mounts a pin 35 moving in unison with the plate. This pin engages an elongated slot 36 in one arm of a lever 37 pivotal about a pivot pin 38 protruding from the chassis. The second arm of the lever is linked by a loaded spring 39 to a swinging lever 40 pivotal about a pin 41, also mounting idler 16. The free end of lever 40 mounts a pin 42 supporting friction roller 20 and also a pulley 43 over which drive belt 21 for the supply reel is guided. A spring (not shown) biases lever 40 into the position of Fig. 7 in which the friction roller 20 is disengaged from capstan 19.

Plate 26 finally mounts by means of an upturned ear 50 a leaf spring 51 having at its ends pressure pads 52 and 53 engageable with tape 15 when pressure roller 20 is in the position of Fig. 8 in which it engages the capstan.

To move the pressure roller into the position engaging the capstan and the pressure pads into the positions engaging the tape, either one of the knobs marked "Record" and "Play" of group 22 respectively, is depressed, the Record knob being shown depressed in Fig. 8 and also in Fig. 1. Upon depression of either knob the respective extension 24 or 25 engages plate 26 and pushes the same from the position of Fig. 7 into the position of Fig. 8. As a result, lever 37 swings about its pivot 38, thereby tensioning spring 39 which in turn pulls friction roller 20 against the capstan. The pivotal movement of lever 20 causes a corresponding tensioning of transmission belt 21. The movement of plate 26 also moves pressure pads 52 and 53 into engagement with tape 15. The Record knob when fully depressed is retained in its depressed position by the retaining and release means of the kind shown in Figs. 2 through 5. Depression of any one of the five knobs of group 22 releases the depressed knob whereupon all the aforedescribed components return from the position of Fig. 8 into the position of Fig. 7.

As previously pointed out, the apparatus according to the invention comprises in addition to the mechanical mechanism and electronic equipment for operating the standard tape 15, a second mechanical mechanism and a second electronic equipment for operating a second tape. The present invention is concerned with the mechanical mechanism only for operating the second tape. The electronic equipment should be visualized as being conventional. It should further be pointed out in this connection, that the two mechanical mechanisms and the two electronic equipments may have certain components in common.

Describing now the arrangement of the second tape and the mechanical mechanism therefor, this tape and the attendant components are shown diagrammatically in the right lower corner of Fig. 1 and more in detail in the subsequent figures.

The second tape is shown as a tape 60 in the form of an endless loop. The tape is stored in a reel 61 of conventional design. It is fed out through a slot 62 in the top of the reel and returned into the same through a channel 63. Idlers 64 and 65 serve to guide the tape past a stationary appropriate magnetic head 66. The tape is driven in the direction indicated by an arrow by frictional engagement of a second friction roller 67 with the capstan. The mechanism for controlling the position of friction roller 67 relative to the capstan is best shown in Figs. 9 and 10. It is similar in principle to the mechanism for controlling the position of friction roller 20. Accordingly, it comprises a plate 68 axially slideable on the chassis plate and guided by pins 69 and 70 protruding from the chassis plate and engaging longitudinal slots 71 and 72 in plate 68. A loaded spring 73 fastened on one end of plate 68 and on the other end to the chassis plate biases plate 68 and with it friction roller 67 into the position in which the friction roller is disconnected from the capstan.

In order to move friction roller 67 into driving engagement with the capstan, two knobs 74 and 75 are provided, one knob being marked "Record," and the other "Play." The knobs have extensions 74' and 75' respectively. If either of the two knobs forming the group 23 is depressed, the respective extension pushes plate 68 into the position in which roller 67 moving in unison with the plate is forced into driving engagement with the capstan. Figs. 9 and 10 show the record knob in the depressed position, whereas Fig. 1 shows both knobs of group 23 in the rest position.

Turning now to Figs. 2 through 5, these figures show more in detail the arrangement of the knobs. The aforementioned extension of each knob is in the form of an angular two-arm lever. A fulcrum is formed at 80 for each lever by a bracket 81 fixedly secured to the chassis plate and a second bracket 82 also fixedly secured to the chassis plate. The two brackets extend across the combined width of the two knobs and, a small longitudinal gap being left between the two brackets within which the extensions 74' and 75' of the knobs can pivot. A spring 83 biases each knob into the position of Figs. 2 and 3 in which the respective arm of the extension rests upon bracket 81 and which constitutes the rest or non-depressed position of a knob. Bracket 81 further mounts a springy bar 84 which extends across the width of both knobs and is secured along its lower longitudinal edge to bracket 81 at 85. The upper longitudinal edge of bar 84 is set off at 84'. The set-off portion of the bar is so positioned that it protrudes into the path of a knob swinging from the position shown in Fig. 3 into the position shown in Fig. 5 for extension 74'. Each extension can be pivoted from the position of Fig. 3 into the position of extension 74' in Fig. 5 by depressing the respective knob, knob 74 being shown depressed in Figs. 4 and 5. While an extension is swinging from its lower position into the upper position it clears its path by pushing the springy bar 84 from its solid line position into the position shown in dotted lines in Fig. 5. As soon as the respective extension clears the upper rim of bar 84, the latter snaps back into its initial position thereby underlying the raised extension for retaining the respective knob in its depressed position as clearly shown in Fig. 5. To release the depressed knob, the other knob 75 is depressed. As is evident, the depression of knob 75 causes the extension 75' thereof to force the set-off portion 84' of bar 84 out of engagement with the extension 74' whereby the extension, and with it the respective knob, are returned into their initial or rest position by action of spring 83.

Retaining and release means of the kind described for knobs 74 and 75 may be used for the knobs of group 22 also. Brackets 81 and 82 and bar 85 may be extended across the width of all the knobs whereby the depression of any knob of either group will release any other knob that may have been previously depressed. Or, each group of knobs may have its own brackets and springy bar. This affords the advantage that only one of the two tapes may be operated, or both simultaneously.

The mechanism for operating the second tape further includes means for adjusting the position of pressure pads 90 similar to the pressure pads 52 and 53 previously described and coacting with tape 60. As is shown in Figs. 1 and 6, the two pressure pads 90 are mounted on a frame or arm 91 having a longitudinal slot 92 extending perpendicular of the plane of the portion of the tape 60 between idlers 64 and 65. Arm 91, and with it the pressure pads 90, can be secured in either one of two fixed positions relative to the tape by loosening and tightening, respectively a screw 93 threaded into the chassis plate 10. This facilitates the insertion and removal respectively of tape 60 by clearing the path of the tape. The tightening of screw 93 can be conveniently manipulated by means of a handle 94.

The mechanism for operating tape 60 finally includes an arrangement for rotating the supply reel 12 for the purpose of rewinding tape 15 when and while intelligence is being recorded on the tape 60, or while it is being reproduced.

Figure 10A:
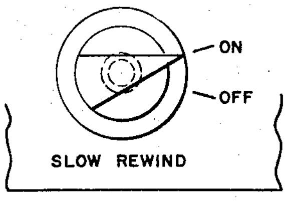

For this purpose, friction roller 67 is drivingly coupled with a pulley 100 seated on drive shaft 11 of supply reel 12 by means of an elastic coil belt 101. Belt 101 is further guided over an idler 102 mounted on plate 68 for axial movement in unison with the plate and a floating idler 103. Idler 103 is mounted on an arm 104 pivotal about a pin 105 extending from the chassis plate 10. The spatial position of arm 104 is controlled by a linkage comprising a link 106 pivoted at one end to arm 104 at 107 and at the other end to a link 108 at 109. Link 108 is pivotal about a pin 110 protruding from chassis plate 10. Link 108 is in the nature of a toggle member which has two stable positions. To this end, a free arm of link 108 has an arcuate slot 111 engaged by a pin 112 extending from chassis plate 10. A loaded spring 113 abuts at one end against pin 112 and at the other end against a pin 114 protruding from link 108. Accordingly, link 108 is compelled to occupy either the limit position of Fig. 9 or the limit position of Fig. 10. Link 108 is conveniently movable from one position into the other by manipulating the handle as shown in Figs. 9*a* and 10*a*.

When link 108 is in the position of Fig. 9, idler 103 occupies a spatial position in which drive belt 101 is too slack to transmit rotation of roller 67 to the supply reel. Upon movement of link 108 into the position of Fig. 10, idler 103 is moved into a position more distant from roller 67 and idler 102. As a result, belt 101 is accordingly tensioned and rotation of roller 67 is now transmitted to supply reel 12 for rewinding tape 15 upon the same.

A comparison of Figs. 9 and 10 further shows that in either position of link 108 and the associated components, the friction roller 67 is in engagement with capstan 19 so that it is driven by the same. As explained before, the position of the friction roller relative to the capstan is controlled by operation of either knob 74 or 75. This affords the advantage that the operation of tape 60 is independent of the operation of the rewind mechanism and that the rewind may be utilized when either knob is depressed.

It is further apparent, that the rate of speed of the rewind derived from roller 67 is controlled by the r.p.m. of this roller and hence, comparatively slow. This affords the aforementioned advantage that the rewind can be effected without requiring constant attention of the operator and without disturbing noise.

Fig. 1 shows a suitably marked knob for operating the slow rewind in a manner similar to the control of the other operations by means of knobs accessible on the chassis plate.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A tape recording and reproducing apparatus comprising, in combination, first tape guiding means including a supply reel and a take-up reel and guide rollers for guiding the tape from one reel to the other, a common drive means including a motor driven capstan and a movably mounted first driving roller, first control means controlling the position of said roller for moving the same into and out of driving engagement with said capstan and said tape; second tape guiding means including guide members for guiding an endless second tape along a predetermined closed path of travel, a movably mounted second driving roller, said guide member guiding the endless tape between the capstan and the second roller in engagement with the latter, and a second control means for moving the second roller into an operative position in which the capstan, the endless tape and the second roller are in driving engagement with each other and into an inactive position respectively; and actuating means coacting with said control means for operating the same selectively and independently of each other.

2. An apparatus according to claim 1, wherein said second guiding means comprise idlers for guiding the endless tape over said second driving roller, and bearing means for rotatably supporting a supply reel for said endless tape.

3. An apparatus according to claim 1, wherein said second guiding means further comprise yieldable pressure means engageable with the endless tape for tensioning the same, and adjustably mounted means for said pressure means to vary the position of the latter relative to the path of the endless tape.

4. An apparatus according to claim 3, wherein said adjustable mounting means comprise a member supporting said pressure means and slidably mounted perpendicular to the portion of the endless tape engageable by said pressure means, and setting means for securing said member in a selected position.

5. A tape recording and reproducing apparatus comprising, in combination, first tape guiding means including a supply reel and a take-up reel and guide rollers for guiding the tape from one reel to the other, a common drive means including a motor driven capstan and a movably mounted first driving roller, first control means controlling the position of said roller for moving the same into and out of driving engagement with said capstan and said tape; second tape guiding means for guiding a second tape along a predetermined path of travel, a movably mounted second driving roller, and second control means for moving the second roller into and out of driving engagement with said capstan and said second tape for moving the latter along said predetermined path, said second control means comprising linkage means including an output link mounting said second driving roller and an input link, an actuating means coacting with said input link, said actuating means controlling the relative position of said links thereby controlling the position of said second driving roller relative to the capstan.

6. An apparatus according to claim 5, wherein said actuating means comprise two actuating knobs independently movable between a rest position and an operative position engaging said input link for controlling said linkage means.

7. An apparatus according to claim 6 and further comprising releasable retaining means for said knobs to retain either knob in the operative position upon movement into the same, and release means coacting with said retaining means for releasing a knob retained by the same upon movement of the knob into the operative position, said retaining means including a yieldable member yieldably arresting the other knob in the operative position and said release means including a release member on each knob for movement in unison therewith, each of said release members being engageable with said yieldable member to force the latter out of its position arresting one knob upon movement of the other knob into its operative position.

8. A tape recording and reproducing apparatus comprising, in combination, first tape guiding means including a supply reel and a take-up reel and guide rollers for guiding the tape from one reel to the other, a common drive means including a motor driven capstan and a movably mounted first driving roller, first control means controlling the position of said roller for moving the same into and out of driving engagement with said capstan and said tape; second tape guiding means for guiding a second tape along a predetermined path of travel, a movably mounted second driving roller, second control means for moving the second roller into and out of driving engagement with said capstan and said second tape for moving the latter along said predetermined path; and rewind means for rotating said supply reel for the first tape, said rewind means including a drive shaft for said reel, an elastically extendable endless transmission belt drivingly coupling said second driving roller with said drive shaft, a guiding roller guiding said belt, said guiding roller being movable between a reel shaft driving position and an inactive position, said belt having a length such that it is slack in said inactive position of the guiding roller and tensioned for the transmission of rotation from the second driving roller to the drive shaft in the driving position of the guiding roller, and actuating means coacting with said guiding roller for selectively moving the same into either position.

9. An apparatus according to claim 8, wherein said rewind means further comprise linkage means including an output link supporting said guiding roller of the rewind means and an input link, said actuating means of the rewind means being coupled with said input link to control the relative position of said links of the rewind means, said relative position of the links controlling the position of the guiding roller of the rewind means relative to the second driving roller thereby lengthening and shortening respectively, the total length of the path of travel of said belt.

10. An apparatus according to claim 9, wherein said linkage means of the rewind means include a further link, and spring means coacting with said further link to bias the same into either one of two limit positions, one of said limit positions causing the guiding roller of the rewind means to move into its driving position and the other into its inactive position.

11. An apparatus accordng to claim 10, wherein the actuating means of said rewind means are operable independently of the actuating means for moving said second driving roller into and out of driving engagement with the capstan and the second tape.

References Cited in the file of this patent

UNITED STATES PATENTS 2,686,057 Woolf ---------------- Aug. 10, 1954